(12) United States Patent
Kalakkunnath et al.

(10) Patent No.: US 9,447,344 B2
(45) Date of Patent: Sep. 20, 2016

(54) ADVANCED CELLULOSIC RENEWABLE FUELS

(71) Applicant: PHILLIPS 66 COMPANY, Houston, TX (US)

(72) Inventors: Sumod Kalakkunnath, Bartlesville, OK (US); Matthew J. Truitt, Bartlesville, OK (US); Jaehoon Bae, Bartlesville, OK (US); Cory B. Phillips, Bartlesville, OK (US)

(73) Assignee: PHILLIPS 66 COMPANY, Houston, TX (US)

( * ) Notice: Subject to any disclaimer, the term of this patent is extended or adjusted under 35 U.S.C. 154(b) by 0 days.

(21) Appl. No.: 14/796,496

(22) Filed: Jul. 10, 2015

(65) Prior Publication Data
US 2015/0329792 A1 Nov. 19, 2015

Related U.S. Application Data

(62) Division of application No. 13/237,533, filed on Sep. 20, 2011, now Pat. No. 9,109,174.

(51) Int. Cl.
| | |
|---|---|
| *C10L 1/18* | (2006.01) |
| *C10G 45/58* | (2006.01) |
| *C10L 1/04* | (2006.01) |
| *C10G 3/00* | (2006.01) |
| *C10L 1/182* | (2006.01) |

(52) U.S. Cl.
CPC . *C10L 1/18* (2013.01); *C10G 3/44* (2013.01); *C10G 3/45* (2013.01); *C10G 3/50* (2013.01); *C10G 45/58* (2013.01); *C10L 1/04* (2013.01); *C10G 2300/1014* (2013.01); *C10L 1/182* (2013.01); *C10L 2200/0469* (2013.01); *C10L 2270/023* (2013.01); *C10L 2290/54* (2013.01); *C10L 2290/548* (2013.01); *Y02P 30/20* (2015.11)

(58) Field of Classification Search
CPC .. C10G 2300/1014; C10G 3/44; C10G 3/45; C10G 3/50; C10G 45/58; C10L 1/04; C10L 1/18; C10L 1/182; C10L 2200/0469; C10L 2270/023; C10L 2290/54; C10L 2290/548; Y02P 30/20
USPC ......................................................... 44/453
See application file for complete search history.

(56) References Cited

U.S. PATENT DOCUMENTS

| | | | | |
|---|---|---|---|---|
| 2011/0046423 | A1* | 2/2011 | Sughrue | C10G 3/45 585/240 |
| 2011/0239532 | A1* | 10/2011 | Baldiraghi | C10L 1/08 44/388 |
| 2012/0061319 | A1* | 3/2012 | Vandezande | B01D 67/0079 210/640 |

* cited by examiner

*Primary Examiner* — Latosha Hines
(74) *Attorney, Agent, or Firm* — Phillips 66 Company

(57) ABSTRACT

The invention relates to a process to manufacture advanced cellulosic gasolines. Dilute organic acids derived from pyrolized biomass are converted to their corresponding alcohols in a stand-alone hydrodeoxygenation unit followed by membrane pervaporation step to remove water. The alcohol product is blended directly into a neat hydrocarbon fuel basestock to make unadditized gasoline.

3 Claims, 12 Drawing Sheets

A

B

ADVANCED CELLULOSIC RENEWABLE FUELS

CROSS-REFERENCE TO RELATED APPLICATIONS

This Application is a Divisional Patent Application of U.S. Ser. No. 13/327,533 filed on Sep. 20, 2011.

FEDERALLY SPONSORED RESEARCH OR DEVELOPMENT

None.

FIELD OF THE INVENTION

This invention relates to a process for the manufacture advanced cellulosic gasoline. In one embodiment of the invention, dilute organic acids derived from biomass are converted to their corresponding alcohols in a stand-alone hydrodeoxygenation unit followed by a membrane pervaporation step to remove water. The alcohol product is blended directly into a neat hydrocarbon fuel basestock to make unadditized gasoline.

BACKGROUND OF THE INVENTION

The use of renewable energy sources is becoming increasingly necessary to reduce emissions of carbon based fuels and provide alternatives to petroleum based energy and processing hydrocarbon-based feedstocks. One of the process alternatives being explored is the pyrolysis of biomass. Biomass is any carbon containing material derived from living or formerly living organisms, such as wood, wood waste, crops, crop waste, waste, and animal waste.

Biomass can be processed using several techniques. One increasingly popular technique for processing wood-based feedstocks. Pyrolysis, which is the thermal decomposition of a substance into its elemental components and/or smaller molecules, is used in various methods developed for producing hydrocarbons, including but not limited to hydrocarbon fuels, from biomass. Pyrolysis requires moderate to high temperatures, generally greater than about 325° C., such that the feed material is sufficiently decomposed to produce products which may be used as hydrocarbon building blocks.

Generally the pyrolysis of biomass produces four primary products, namely water, "bio-oil," also known as "pyrolysis oil," char, and various gases ($H_2$, CO, $CO_2$, $CH_4$, and other light hydrocarbons) that do not condense, except under extreme conditions.

Fast pyrolysis is one method for the conversion of biomass to bio-oil with high yields. Fast pyrolysis is the rapid thermal decomposition of organic compounds in the absence of atmospheric or added oxygen to produce liquids, char, and gas. Generally, fast pyrolysis uses dry (<10% moisture) feedstock of biomass comminuted into small particles (<about 3 mm), moderate temperatures (325-750° C.), and short residence times (0.5-2 seconds). This pyrolysis reaction may be followed by rapid quenching to avoid further decomposition of the pyrolysis products and secondary reactions amongst the pyrolysis products.

Fast pyrolysis affords operation at atmospheric pressure, moderately high temperatures, and with low or no water usage. Bio-oil yields typically range from 50-75% the mass of input biomass and are heavily feedstock dependent. Generally, known methods of bio-oil production result in bio-oil with high oxygen (>50 wt %) and water content (>30%); such oxygen and water content may result in storage instability and phase-separation issues.

For example, the pyrolysis of a wood based biomass will produce a mixture of organic compounds such as lignin fragments, aldehydes, carboxylic acids, phenols, furfurals, alcohols, and ketones, as well as water. Unfortunately, compounds such as the aldehydes and acids may react with other components of the bio-oil, creating instability, corrosiveness, and poor combustion characteristics.

Bio-oil typically requires additional upgrading in the presence of a catalyst and/or hydrogen to be used in transportation fuel applications. These upgrading steps can be integrated into the existing pyrolysis unit or used in post-treatment schemes. Shabtai, et al., U.S. Pat. No. 5,959,167, use a catalytic reaction process to produce a reformulated hydrocarbon gasoline product. Marker and Petri, U.S. Pat. No. 7,578,927, convert pyrolytic lignin material into naphtha and diesel boiling range components, having low acidity and ultra-low sulfur content. Zmierczak and Miller, US2008050792, use a base catalyzed depolymerization (BCD) reaction to produce a partially depolymerized lignin for further processing to fuel range products. Baldiraghi and associates, WO2008113492, describes a process using hydrodeoxygenation followed by hydroisomerization on an acidic $SiO_2/Al_2O_3$ catalyst. Bzdek and Pellegrino, US2008092435, provide biodiesel fuels prepared by removing deleterious chemical species from the fuel to insure the filterability of the fuel, both neat and in various biodiesel fuel blends. Kleinert, et al. (2009), convert lignin residues from lignocellulosic ethanol production into organic liquids with a high hydrogen to carbon (H/C) and a very low oxygen to carbon (O/C) ratio.

Upgrading pyrolysis oils is difficult due to acidity of the pyrolysis oil, contamination with other compounds, and the tendency to form coke by-products. Damaging costly cracking catalysts is expensive and removes any profit margins from processing biomass and pyrolysis oil to high value hydrocarbons. Therefore, it would be desirable to have a method of cracking biomass, decreasing acidity by removing the organic acids and upgrading pyrolysis oil into useful products in a cost effective manner.

BRIEF SUMMARY OF THE DISCLOSURE

In one embodiment, a process to manufacture advanced cellulosic gasoline is described. Dilute organic acids derived from pyrolized biomass are converted to their corresponding alcohols in a stand-alone hydrodeoxygenation unit followed by membrane pervaporation step to remove water. The alcohol product is blended directly into a neat hydrocarbon fuel basestock to make unadditized gasoline.

In one embodiment, a system for producing a renewable gasoline from cellulosic biomass is described where a cellulosic feedstream is separated via an ionic separator (ISEP) into a sugar/polyol stream and a water/carboxylate stream. The polyol stream system is hydrotreated to generate hydrocarbons from sugars and polyols, and isomerized (ISOM) to generate isomerized gasoline range hydrocarbons. The carboxylate stream system is hydrodeoxygenated (HDO) generating gasoline from the carboxylate stream and hydrogen. A portion of the hydrocarbon stream, is cold separated to separate alcohols, water, and hydrogen, and a membrane separated to remove water from alcohol. The gasoline range hydrocarbons are mixed with alcohols to produce a renewable gasoline.

In another embodiment, a method for producing a renewable gasoline from cellulosic biomass where a cellulosic feedstream is separated using an ionic separator (ISEP) to generate a sugar/polyol stream and a water/carboxylate stream. Hydrocarbons are generated from the sugars and polyols using a hydrotreating (HT) reactor and converting the hydrocarbons to isomerized gasoline range hydrocarbons using an isomerization (ISOM) reactor. Alcohols are generated from the carboxylate stream (b), hydrocarbons (i) and recycled hydrogen in a hydrodeoxygenation (HDO) reactor. Alcohol, water, and hydrogen are separated using a cold separator, and water is removed using a membrane separator. Product streams are produced comprising alcohol and gasoline range hydrocarbons.

In another embodiment, a renewable gasoline is produced from cellulosic biomass by feeding a cellulosic feedstream; using a separator (ISEP) to generate a polyol stream and a water/carboxylate stream: generating hydrocarbons from polyols using a hydrodesulfurization (HDS) reactor and converting the hydrocarbons to isomerized gasoline range hydrocarbons using an isomerization (ISOM) reactor; generating alcohol from the carboxylate stream (b), hydrocarbons (i) and recycled hydrogen in a hydrodeoxygenation (HDO) reactor, separating alcohol, water, and hydrogen using a cold separator, and removing water using a membrane separator; and producing a renewable gasoline by blending alcohol and gasoline range hydrocarbons.

The renewable gasoline may be a premium, E10, E20, E85, or other blended gasoline product. The HDO reactor may contain $CuO$, $ZnO$, $Fe_2O_3$, $CuO/ZnO$, $CuO/Fe_2O_3$, $ZnO/Fe_2O_3$, $CuO/ZnO/Fe_2O_3$, $CuO/ZnO/Al_2O_3$, $CuO/Al_2O_3/SiO_2$, $CuO/Fe_2O_3/Al_2O_3/SiO_2$, catalysts and combinations of those catalysts. The pervaporation membrane may have a hydrophilic, hydrophobic, organophillic, polydimethylsiloxane (PDMS), polyvinyl alcohol (PVA), polyimide, ceramic, zeolite, amorphous silica, hybrid membranes, or combinations of membranes.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The pyrolysis method of upgrading biomass into motor fuel feedstocks produces aqueous streams containing roughly 50% of the total carbon content of the original substrate. Light organic acids (eg. formic, acetic, and propanoic acid) make up 20% of the carbonaceous species in this waste stream. Another sizable portion of this aqueous carbon is contained in various sugar molecules. The corrosive nature and high acid content of the stream prohibits many traditional upgrading routes, yet as it is a reasonable amount of the pyrolysis product, it is desirable to seek methods of converting the stream into products. Any renewable fuel product from the conversion of the acids in the aqueous stream could potentially fall into the category of an "Advanced Biofuel" or "Cellulosic Biofuel" assuming the reduction of baseline greenhouse gas emissions requirement is met. (The Advanced Biofuel classification requires a 50% reduction of the baseline lifecycle greenhouse gas emissions (BLGGE) of the new fuel over that being replaced, and Cellulosic requires a 60% reduction.)

Hydrodeoxygenation (HDO) of the acids to the corresponding alcohols and decarbonylation or dehydration of these alcohols to gaseous products are techniques use to upgrade bio-oil to hydrocarbon fuels. Aspects of these techniques are advantageous and disadvantageous. HDO of the acids to alcohols yields products which have appealing physical properties for direct blending into motor fuels (eg. ethanol, propanol, etc.) However, the process consumes a substantial amount of hydrogen which could prohibit the classification of the product as a Cellulosic or Advanced Biofuel. The $CO_2$ footprint of the fuel could be reduced if a low-$CO_2$ or $CO_2$-free $H_2$ source is used leaving this as a viable option for upgrading. Assuming the greenhouse qualification is met, this could potentially compete with cellulosic ethanol, a highly discussed product being explored by other groups in the field which is produced by the fermentation of carbohydrates obtained by acid hydrolysis of cellulose.

Figure 1:
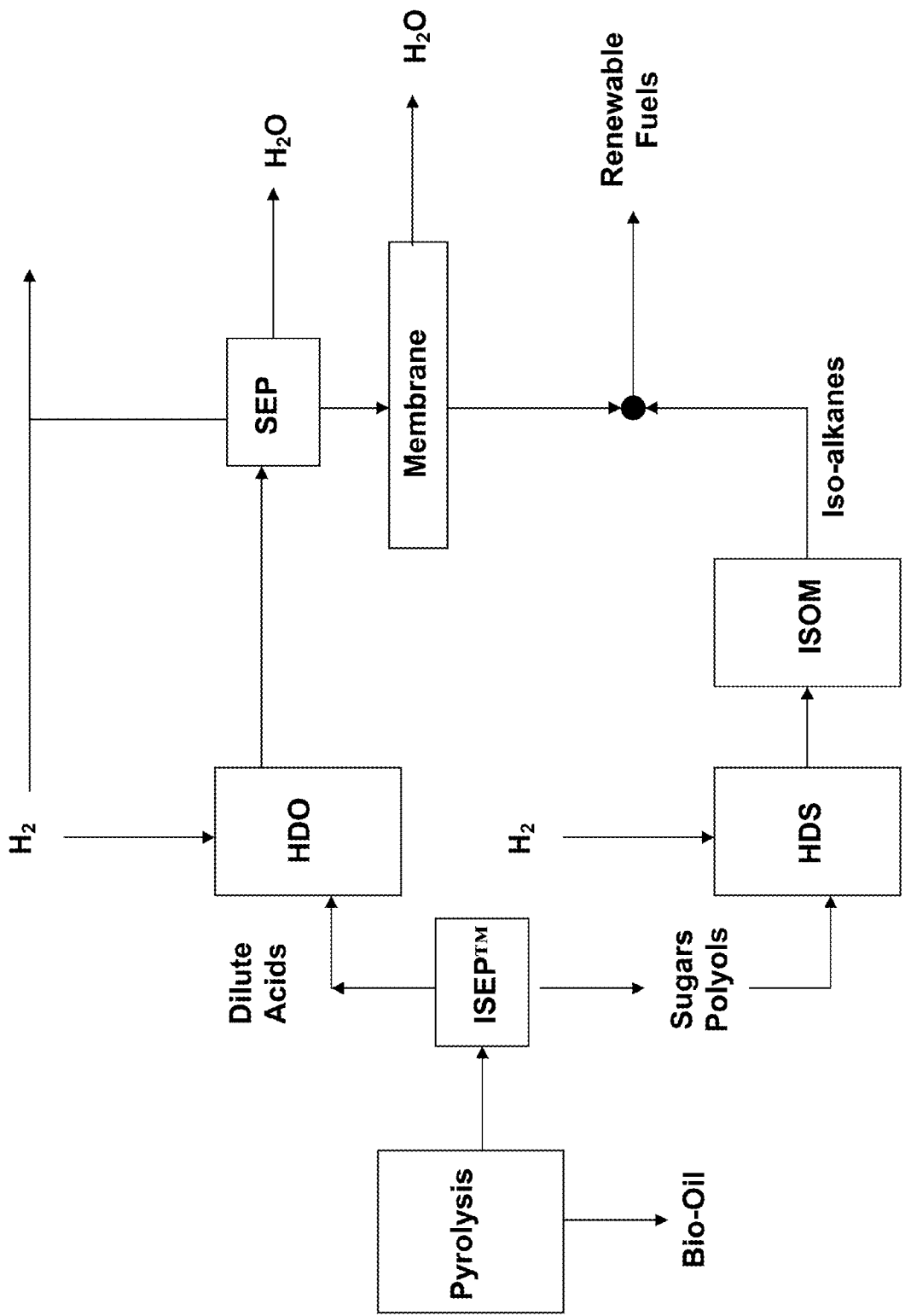
FIG. 1: Overview of the Advanced Cellulosic Gasoline Process.

In one embodiment, dilute stream of ogranic acids is converted to oxygenated gasoline blending components in high yields thus eliminating the need for traditional evaporators and distillation columns. The process involves three main steps (in the following ordered sequence): 1.) HDO of the dilute organic acid feedstream to alcohol followed by 2) Membrane separation of the produced water in step 1. and 3) co-blending with hydrocarbons to form the final fuel product. Additional hydrocarbons used in the final blending step can come from the sugars in the original waste stream and/or any other source of neat hydrocarbons. Therefore, the final blend can be partially or completely renewable. An example is illustrated in the attached FIG. 1. Here, dilute acetic acid produced from the pyrolysis of corn fiber is separated from the sugar fraction. Hydrogen is added to this stream. It is then preheated and sent to the HDO unit operating at very high yields and complete conversion of the organic acid. The resulting product stream consisting of mainly ethanol, water, $H_2$, with small amounts of ethyl acetate is sent to a high pressure, cold separator to remove some of the water and flash-off the hydrogen-rich light-gases for recyling. The remaining hydrous stream rich ethanol is sent to a pervaporation unit containing a hydrophilic material to completely separate out the water. The concentrated ethanol stream is blended with hydrocarbons and sent directly to storage as unadditized E85 or blended with sugar-alcohol derived hexane isomers to make unadditized E10 or E20 gasoline.

Dilute, "waste" organic acid streams are converted in a HDO reactor loaded with a novel catalyst that requires no sulfiding pre-treatment or sulfiding agents, and works at mild temperatures <600° F. and lower $H_2$ pressures, <800 psig. The water is removed from the product stream using pervaporation technology. So, there is no need for high temperature, azeotropic, molecular sieve based fractionation. A final membrane separation step allows for the alcohol product stream to be "ready for fuel blending" by drying and removing any remaining water.

Dilute organic acid streams may be any biologically derived organic acid stream including, but not limited to, natural fermentation products, pyrolysis products, and other sources of biological acids. Cellulosic pyrolysis product as used herein may be pyrolysis product from any natural biological source including but not limited to plant materials, cellulosic biomass, wood pulp, waste paper products, wood chips, cotton byproducts, cotton wastes, corn fibers, grasses, cellodextrins, polysaccharides, hemp, switchgrass, Miscanthus, Salix (willow), and Populus (poplar), as well as lignins, insoluble starches, glycogens, and other biological solids.

Hydrodeoxygenation catalyst as used herein includes a copper (Cu) or iron (Fe) catalyst that catalyzes the reduction of carboxyl functional groups in organic acids. In one embodiment, a supported CuO catalyst is used that may include any solid support with CuO precipitated. The CuO catalyst may contain a promoter or additional catalytic metals. In one embodiment, a bulk $CuO/ZnO/Al_2O_3$ syn-gas conversion catalyst is used. In another embodiment, a $Fe_2O_3$ catalyst is used including but not limited to $CuO/Fe_2O_3/Al_2O_3/SiO_2$. Other catalysts may also be available that selectively reduce carboxyl functions in organic acids to produce hydroxyl functions in alcohols.

Organic acids may include acetic acid, propionic acid, butyric acid and the like.

In one embodiment' the membrane cell contains (i) sintered disk, (ii) fleece, (iii) flat sheet membrane, and (iv) O-ring.

The fundamental equations governing the pervaporation mechanism are detailed below. The flux of component i across the membrane is given by the relation:

$$J_i = \frac{P_m^i}{l}[f_i^L - f_i^P] \tag{1}$$

Where ($P_m^i/l$) is permeance across the membrane. The driving force in pervaporation is the fugacity difference across the membrane, i.e., the difference in the fugacity of the liquid feed ($f_i^L$) and the permeate in the vapor form ($f_i^P$). Therefore, from Eq. 1 we get:

Flux=Permeance·Driving Force

For the sake of simplicity, a high vacuum is assumed to be applied on the permeate side rendering the fugacity of the permeate ($f_i^P$) insignificant in comparison to the fugacity of the feed. Hence, $f_i^P$ tends to zero. Eq. 1 can thus be simplified to:

$$J_i = \frac{P_m^i}{l}[f_i^L] \tag{2}$$

In pervaporation, the fugacity of the liquid feed inclusive of all the non-ideality effects is given by the relation:

$$f_i^L = \gamma_i x_i \phi_i^{sat} P_i^{sat} \exp\left[\frac{\int_{P_i^{sat}}^P V_i \, dP}{RT}\right] \tag{3}$$

The exponential term in Eq. 3 is known as the Poynting correction factor. For temperatures quite less than the critical temperature the variation in the liquid phase molar volume ($V_i$) with pressure is negligible.3 Calculating $V_i$ at saturation condition gives the generalized form of fugacity:

$$f_i^L = \gamma_i x_i \phi_i^{sat} P_i^{sat} \exp\left[\frac{V_i^{sat}(P - P_i^{sat})}{RT}\right] \tag{4}$$

The activity coefficient (γ) is calculated from Gibbs free energy models like NRTL-RK for the corresponding feed composition and temperature. The operating feed pressures for pervaporation are low enough to assume ideal gas behavior. The feed pressure (P) in Eq. 4 is typically close to atmospheric pressure. As a result, the fugacity coefficient term ($\phi_i^{sat}$) can be approximated as equal to 1. Also, the Poynting correction factor is significantly different from 1 only if the pressure differential (Eq. 4) is high. As an example, for water, Poynting correction factor is 1.007 for a pressure differential of 10 atm Therefore, for pervaporation the exponential term can be regarded as equal to 1.

The simplified form of fugacity equation is as follows:

$$f_i^L = \gamma_i x_i P_i^{sat} \tag{5}$$

Where the vapor pressure is obtained using the Antoine Equation at the feed temperature while the mole fraction ($x_i$) is calculated from a composition analysis of the feed using a Gas Chromatograph. The flux is obtained from the amount of permeate collected across the membrane in a stipulated time. Thus, a pervaporation experiment provides the flux of the component though the membrane and the compositions of the feed and permeate.

Substituting the experimentally derived values in Eq. 2 & 5, the permeability of species i is given by:

$$P_m^i = \frac{J_i l}{\gamma_i x_i P_i^{sat}} \quad (6)$$

Selectivity ($\alpha_{i/j}$) of component i is calculated from the feed and permeate concentrations by the following relation:

$$\alpha_{i/j} = \frac{(y_i/y_j)}{(x_i/x_j)} \quad (7)$$

Selectivity, in a pervaporation process, is a combination of the relative volatility ($\alpha_{VLE}$) of the species and the intrinsic membrane selectivity ($\alpha_0$) as shown by the following relation:

$$\alpha_{i/j} = \alpha_{VLE} \cdot \alpha_0 \quad (8)$$

The key variables to ascertain membrane performance, i.e., permeability and selectivity can thus be determined experimentally.

The maximum permeate pressure to achieve separation is given by the fugacity of the permeating components on the feed side. If the fugacity on the permeate side becomes higher than or equal to the one on the feed side, then there will be no flux. For industrial scale operation, high vacuum levels obtained at lab-scale may not be achievable. This can be compensated by increasing the membrane area. Also, for commercial membranes the selective layer of membrane is relatively thinner (1-2 microns) resulting in higher flux.

Pervaporation Membrane as used herein is a membrane or membrane system that can be used to perform pervaporation to separate water and alcohols. Pervaporation is a process that facilitates the separation of two or more species via simultaneous porous diffusion and evaporation. The membrane material is selected to maximize the separation required and different pervaporation membranes may be used for different separtations. A hydrophilic membrane is used for dehydration of organic solvents. A hydrophobic membrane is used for the removal of volatile organics. An organophilic membrane is used for the separation of aromatics hydrocarbons from aliphatics. The membrane material can be altered to obtain the right combination of flux and selectivity. Numerous hydrophobic membranes are available including polydimethylsiloxane (PDMS). Hydrophilic membranes including polyvinyl alcohol (PVA), polyimide, ceramic, zeolite, and other membranes with hydrophilic properties. In addition to ceramic membranes, amorphous silica membranes have been manufactured using sol-gel chemical processes to tailor membrane selectivity. Hybrid membranes including organic-inorganic hybrids may also be used to further tailor pervaporation selectivity. Membranes may be supported membranes or hollow fiber membranes. HYBSI® hybrid silica membranes may be used under hydrothermal and/or acidic conditions. The Pervap 2200® is a hydrophilic PVA membrane with a polyacrylonitrile (PAN) support used to separate water from organics. A variety of membranes are available from PERVATECH™, SULZER™, Jiangsu Jiuwu High-Tech Co., Ltd., King Membrane Energy Technology Inc., Fortune International Tech Materials Inc., and others, including thin film membranes described in WO/2010/145901, poly(1-trimethylsilyl-1-propyne) (PTMSP) membranes and other pervaporation membranes. Because membranes are selected based on the properties of the retentate and permeate, it is possible to select one or more membranes for a separation dependent upon the system, temperatures, flux, and other properties, to achieve a high level of separation.

Feed composition as described herein is the mixture of two or more components in a feedstock. Feedstocks may include a variety of oxygenates, organic acids, polyols, alcohols, hydrocarbons, water, salts, and byproducts found in pyrolysis oil, HDO intermediates and HDO products. The composition influences the membrane performance and type of membrane chosen. The selectivity of a membrane decreases as the number of components in the feed mixture increase and is affected by the concentrations of those components. Although some examples are provided there is a wide range of feed compositions that cannot be enumerated here. The feed composition will typically be raw feed stream produced from the HDO reaction that may or may not be processed to remove contaminants.

The feed stream may contain any concentration of alcohol and water along with other contaminants, intermediates and byproducts. The feed stream may contain anywhere from 1 to 99% alcohol and inversely may contain anywhere from 99 to 1% water. In one embodiment, the feed stream comprises 90% ethanol and 10% water. In another embodiment the feed stream comprises approximately 1:9 alcohol:water; approximately 2:8 alcohol:water; approximately 3:7 alcohol:water; approximately 4:6 alcohol:water; approximately 5:5 alcohol:water; approximately 6:4 alcohol:water; approximately 7:3 alcohol:water; approximately 8:2 alcohol:water or approximately 9:1 alcohol:water. The ratio of alcohol to water may be controlled for the purpose of making model preparations and baseline testing, but the raw feed from the HDO may have a variety of alcohol, water and contaminant concentrations that are affected by the amount of water in the biological feed stream, water added during processing and water separated using other methods. Thus the pervaporation feed stream may have an unknown concentration of alcohol, water and other byproducts.

In order to maximize permability, if the alcohol concentration is above 50%, a hydrophilic membrane may be used making water the permeate and alcohol the retentate. Feed streams may be subjected to one or more membrane pervaporations to increase alcohol concentrations. Final concentrations for dried alcohol may have less than 0.1 wt % water.

Feed temperature as used herein is the temperature of the feed stream. In pervaporation, it is desired to have the feed temperature as high as possible to increase the vapor pressure of the components. This is typically determined by the maximum temperature at which the membrane is stable. In one embodiment a PVA membrane is stable to about 100° C., but may increase or decrease in various feed stream compositions, preparation and/or treatment of the membrane, and/or source of the membrane. In another embodiment feed temperature is 80° C. Feed temperatures may range from slightly above water's freezing point to near boiling and are dependent upon the feed composition, temperature and pressure of the system. Feed temperatures may be between approximately 0° C. and approximately 120° C., including approximately 10° C., 20° C., 30° C., 40° C., 50° C., 60° C., 70° C., 80° C., 90° C., 100° C., to about 110° C. Although some examples are provided there is a wide range of feed temperatures that cannot be enumerated here. The feed temperatures may simply be the temperature at which the alcohol/water mixture is produced from the previous production step.

Feed flow rate as used herein is the volumetric rate of fluid flow of the feed stream. The flow rate is kept at maximum rate such that the entire membrane area experiences the same temperature and concentration of feed. In one embodiment, the flow rate is maintained at 140 liters/hr.

Permeate pressure as described herein is the pressure on the permeate side of the membrane. The permeate pressure is less than the feed/retentate pressure to drive permeate across the membrane. To obtain flux, the permeate pressure should be lower than the vapor pressure of the component to be separated. In one embodiment, the permeate pressure is kept as low as possible to allow the maximum driving force for separation (Eq. 1 & 2). In one embodiment, the vacuum on the permeate side is maintained at approximately 3 mbar.

The following examples of certain embodiments of the invention are given. Each example is provided by way of explanation of the invention, one of many embodiments of the invention, and the following examples should not be read to limit, or define, the scope of the invention.

Example 1

HDO

Light organic acids compose a major portion of the pyrolysis oil (up to 10 wt %) product used for producing biofuels. These organic acids generally appear in low concentrations within the aqueous fractions of the pyrolysis oil. Reconstitution of pyrolysis oil from essentially these aqueous waste streams into biofuels is accomplished by HDO. HDO produces alcohols from this organic acids which may be directly blended into conventional fuels. Several catalysts were identified and examined for their relative activity in converting a model stream of acetic acid to ethanol. One catalyst (CuO/ZnO/Al$_2$O$_3$) was selected to carry-out HDO, and a matrix of designed experiments were performed to model the conversion over a range of conditions. CuO/ZnO/Al$_2$O$_3$ produced a variety of products at high conversion (94% conversion), and a high yield, 75%, of ethanol.

CuO/ZnO/Al$_2$O$_3$ synthesis gas conversion catalyst with a MgO promoter was prepared via coprecipitation (nominally 67.3% CuO, 22.8% ZnO, 8.9% Al$_2$O$_3$, 1.0% MgO). A solution containing the desired ratio of copper nitrate, zinc nitrate, aluminum nitrate, and magnesium nitrate was precipitated at a pH of 9.5 using a 2 molar sodium carbonate solution to maintain pH. The solution was digested at 70° C. for 60 minutes under continuous stirring. Samples were filtered and washed with DI water, dried, and calcined at 350° C. for 6 hours. Catalyst was sieved to −40/+100 mesh. Catalyst samples were reduced at 300° C. prior to use.

CuO/Fe$_2$O$_3$/Al$_2$O$_3$/SiO$_2$ was prepared by the incipient wetness technique using dried silica as a support (5% CuO, 50% Fe$_2$O$_3$, 10% Al$_2$O$_3$, 35% SiO$_2$). Al$_2$O$_3$ was loaded first onto the support by dissolving the desired amount of aluminum nitrate in the volume of water which the particles were capable of absorbing. The catalyst was dried overnight and calcined at 635° C. for 2 hours. Iron citrate and copper nitrate were then added to the catalyst in the desired loadings using the same method. The final catalysts were again dried and calcined at 635° C. for 2 hours. Catalyst samples were reduced at 480° C. in pure H$_2$ prior to use. CuO/Al$_2$O$_3$/SiO$_2$ was prepared similarly, but without the addition of iron (5% CuO, 10% Al$_2$O$_3$, 85% SiO$_2$).

Catalytic data were acquired using a ½", downflow reactor. An alundum bed was used above the catalyst bed to assist in flashing the feed to reaction temperature prior to contacting the catalyst. Catalysts were diluted in alundum to a constant bed volume. The reactor was heated using a three-zone furnace with independent temperature control for each zone. Gaseous carriers and reagents were delivered using mass flow controllers. Liquid feed was delivered to the system by a high-pressure syringe pump. The system pressure was controlled by a backpressure regulator.

Catalysts were reduced in-situ for 2 hours in 500 sccm H$_2$ at 400 psig prior to each run at the temperatures specified earlier. Runs were performed at a constant liquid feed rate of 15 mL/hr, using a nominally 10.4 wt % acetic acid in water feed. The H$_2$:HC ratio was 51.5, and the H$_2$O:HC was 28.8 for all HDO runs.

The corrosive nature and high acid content of the aqueous pyrolysis oil products prohibit many traditional upgrading routes. These properties also limit the catalysts that may be used in its upgrading as many are metal oxides which would be dissolved in the passing liquid organic acid. The simplest method of mitigating the corrosiveness of the feed is to flash it off prior to contacting it with the catalyst. While energetically demanding, this method was found to be effective in allowing the use of several catalysts which readily dissolve in the aqueous liquid acid even at room temperature (e.g. CuO/ZnO/MgO/Al$_2$O$_3$.)

The conversion of organic acids to alcohols via HDO is a straight-forward approach for upgrading to transportation fuels. Three catalysts were selected for examining the conversion of aqueous acetic acid to ethanol.

TABLE 3

Comparison of Catalysts for HDO Activity[1]

| Catalyst | % Conversion | % Selectivity[2] |
|---|---|---|
| CuO/ZnO/Al$_2$O$_3$[3] | 94.2% | 76.2% |
| CuO/Al$_2$O$_3$/SiO$_2$ | <1% | ~0% |
| CuO/Fe$_2$O$_3$/Al$_2$O$_3$/SiO$_2$ | 5.8% | 17.5% |

[1]Reactions at 350° C., 400 psig, and 7.5 h$^{-1}$ LHSV.
[2]Selectivities are given to ethanol.
[3]CuO/ZnO/Al$_2$O$_3$ reaction at 325° C. to reduce the possibility of sintering.

Results from the catalysts examined are presented in Table 3. The CuO/ZnO/Al$_2$O$_3$ catalyst produced the highest yield of ethanol, followed by significant yields of light gases and smaller amounts of methanol, ethyl acetate, and acetone. CuO/Fe$_2$O$_3$/Al$_2$O$_3$/SiO$_2$ exhibited a lower level of conversion. CuO/Al$_2$O$_3$/SiO$_2$ exhibited almost no ethanol conversion. The formation of acetone by the CuO/ZnO/Al$_2$O$_3$ sample may be explained by the following reactions 1, 2, and 3 (below). Given this fact, it is somewhat surprising that the supported

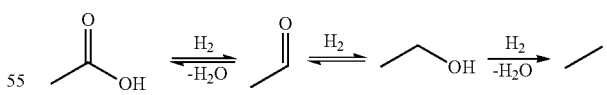

(1)

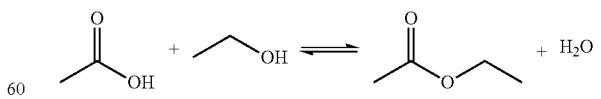

(2)

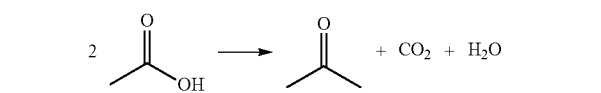

(3)

CuO/Fe$_2$O$_3$/Al$_2$O$_3$/SiO$_2$ did not produce any appreciable amount of acetone nor CO$_2$.

Figure 4:
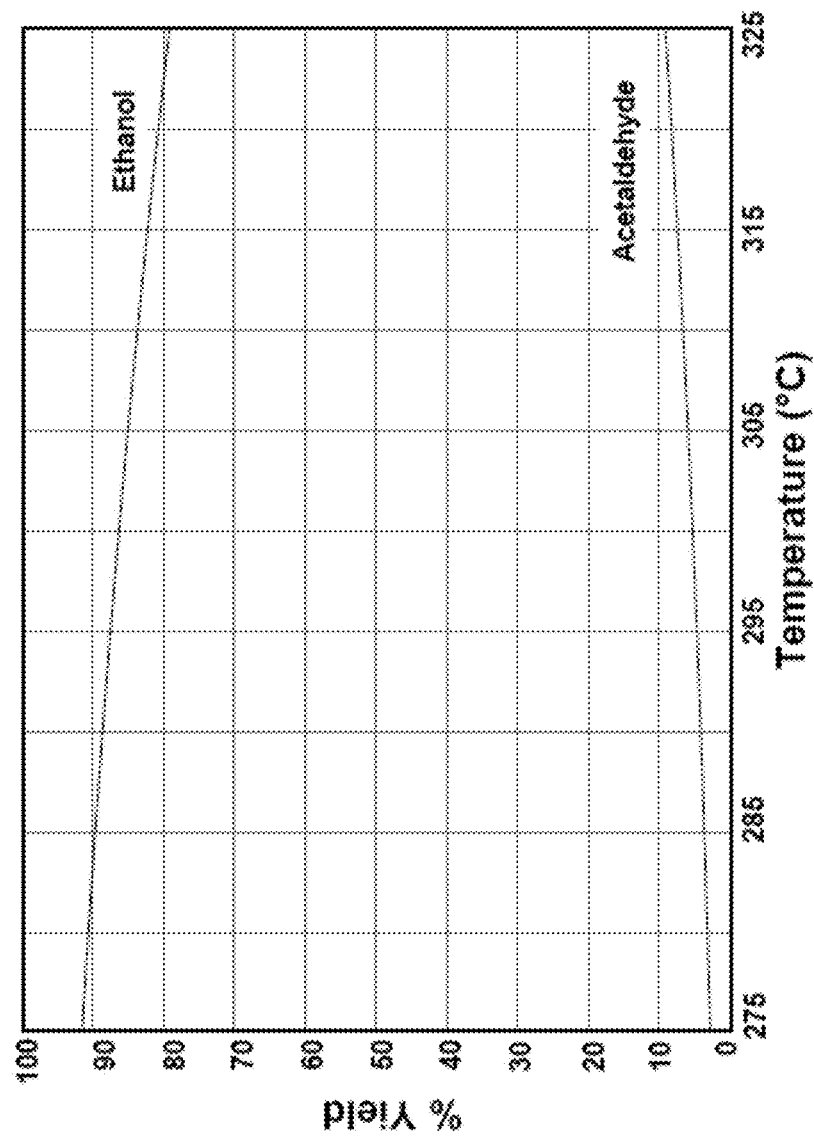
FIG. 4: Equilibrium limited yield of ethanol and acetaldehyde as a function of temperature at constant pressure (P=250 psig), $H_2$:HC=50:1, and $H_2O$:HC=28:1.
Figure 5:
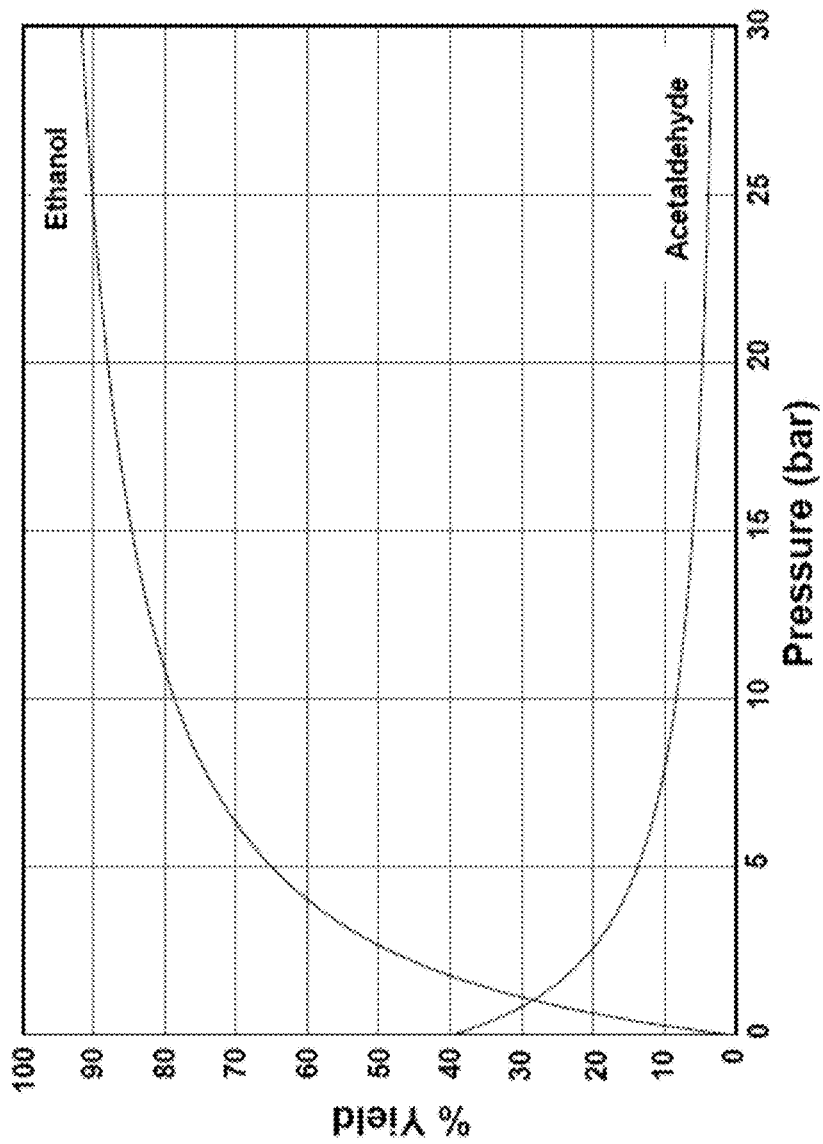
FIG. 5: Equilibrium limited yield of ethanol and acetaldehyde as a function of pressure at constant temperature (T=300° C.), $H_2$:HC=50:1, and $H_2O$:HC=28:1.
Figure 6:
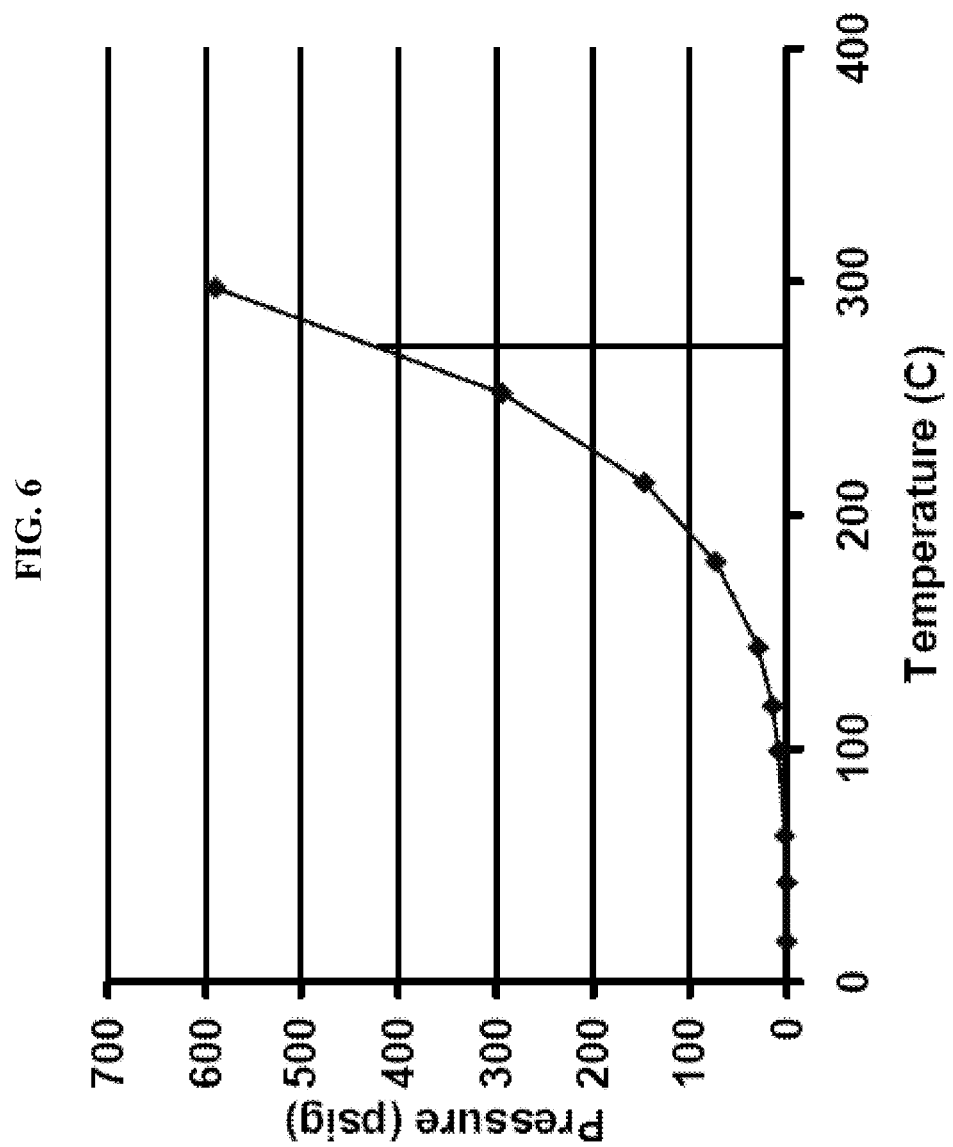
FIG. 6: Saturation pressure of pure acetic acid vs. temperature. The bold line is at T=275° C. for reference.
Figure 7:
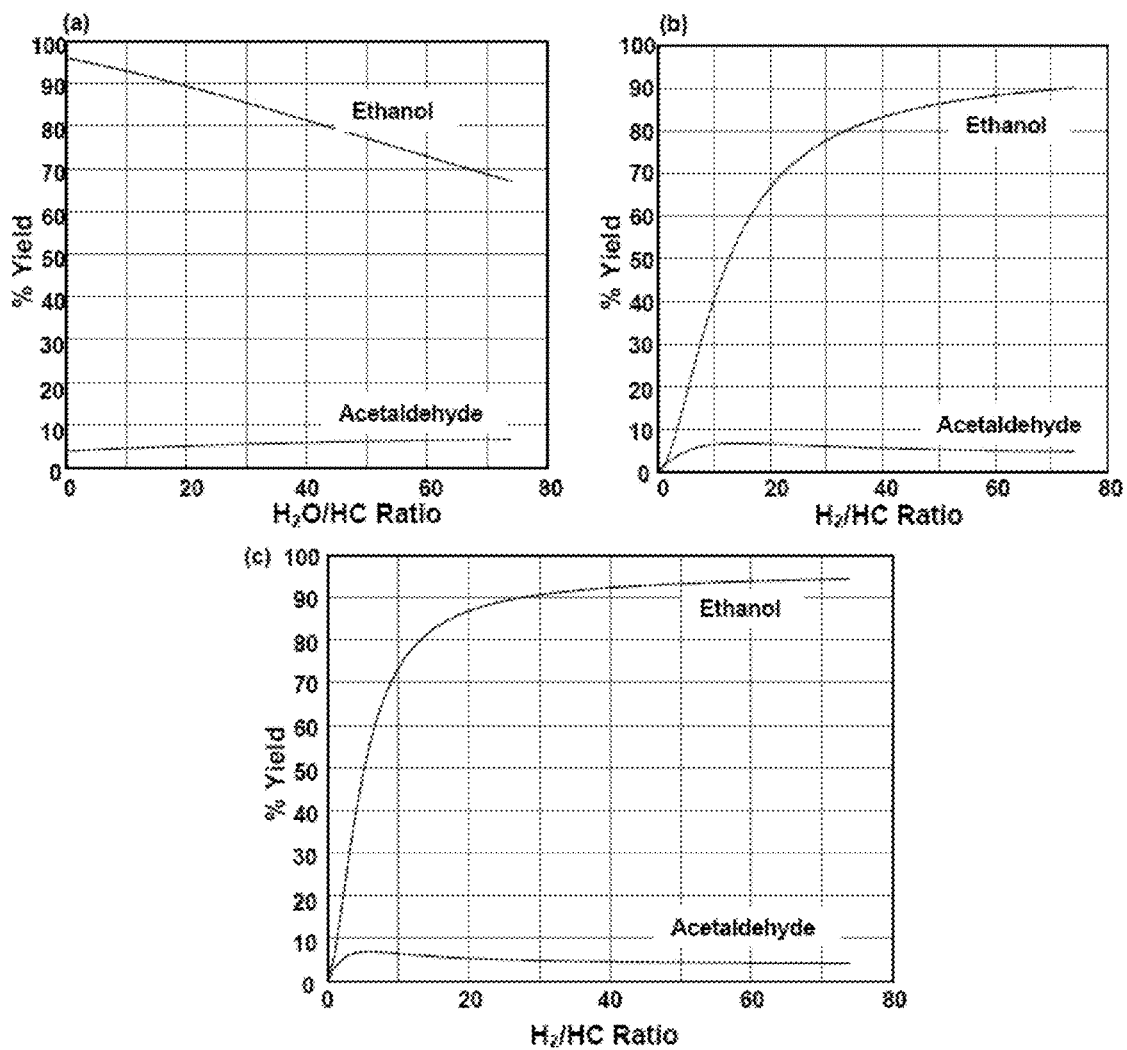
FIG. 7: (a) Equilibrium limited yield of ethanol and acetaldehyde as a function of water content of feed at constant temperature and pressure (T=300° C., P=250 psig, $H_2$:HC=50.) (b) Equilibrium limited yield of ethanol and acetaldehyde as a function of hydrogen to acetic acid ratio at constant temperature and pressure (T=300° C., P=250 psig, $H_2O$:HC=28.) (c) Same conditions as (b), but $H_2O$:HC=9.3.

FIGS. 4 and 5 illustrate how the equilibrium yield of ethanol and acetaldehyde are affected by changing individual run conditions. As temperature is increased, ethanol's limited yield decreases due to the positive entropy of the reaction. Increasing pressure increases the limited yield due to LeChatlier's Principle as the $\Delta n_{gas}$ for the overall reaction (acetic acid$\Delta$acetaldehyde$\Delta$ethanol) is −1. It is important to point out that while it seems that increasing the pressure and decreasing the temperature would be the optimum way of converting the stream (assuming a catalyst was available to reach equilibrium), one must also be cognizant of the liquid-vapor phase transition along the P-T curve. As mentioned previously, condensing the acid in the catalyst bed would result in dissolution of the media. FIG. 6 contains the saturation pressure for acetic acid as a function of temperature. From the diagram, operation at 275° C. has a saturation pressure just above 400 psig.

Model streams of acetic acid representing the aqueous organic acid stream produced during the conversion of biomass to pyrolysis oil may be upgraded to gasoline range alcohols (conversion=94%, yield alcohols=72%, LHSV=7.5 h$^{-1}$, P=400 psig, T=325° C.). HDO's alcohol products compete directly with cellulosic ethanol given renewable $H_2$ and heating sources. If high $H_2$/HC ratios limit increase costs due to compression of the hydrogen, concentration of the acetic acid feedstream is a straight-forward method of reducing the hydrogen requirement.

Example 2

Pervaporation Membrane Unit

Pervaporation is a membrane-based technique used for separation of liquid mixtures and in particular for challenging separation of azeotropes and close-boiling components. For example, binary mixtures of water and ethanol form an azeotrope at 95% ethanol. With the anticipated need for reducing the carbon footprint in an operation, pervaporation can provide an alternative to certain distillation steps thus making refinery operations more energy efficient. A pervaporation membrane testing unit (FIG. 8B) and its validation using commercial membranes is described. It illustrates the basics of pervaporation, the experimental procedure and analysis required to assess membrane performance. In one embodiment, 80% of the water is removed from a 90/10 wt % ethanol/water mixture using a hydrophilic (SULZER PERVAP2200®) membrane. In addition to 90/10 ethanol/water separation, commercial grade pervaporation systems can be used to separate hydrocarbon mixtures on a commercial scale. These membrane-based refinery configurations decrease $CO_2$ emissions.

Figure 8:
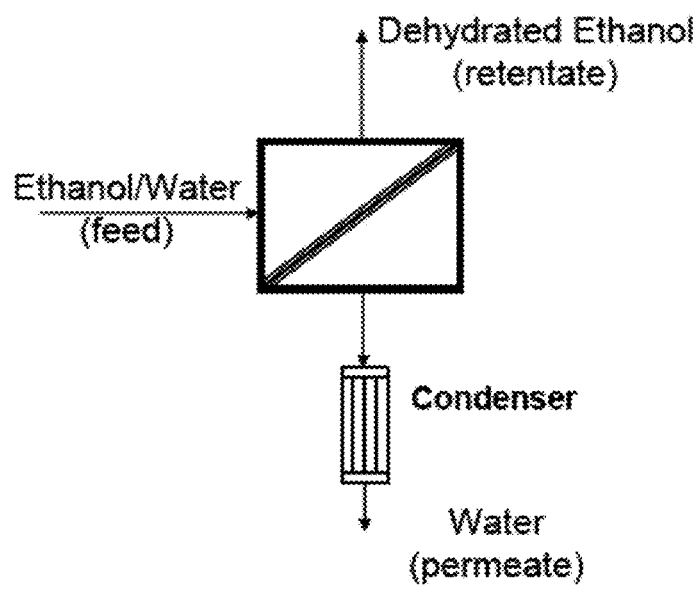
FIG. 8: Schematics of a pervaporation membrane. A) A pervaporation membrane with an ethanol/water feed. B) The pervaporation membrane including 500 ml reservoir with thermostat, feed stream, return regulation valve, concentrate, permeate and a vacuum pump.
Figure 8:
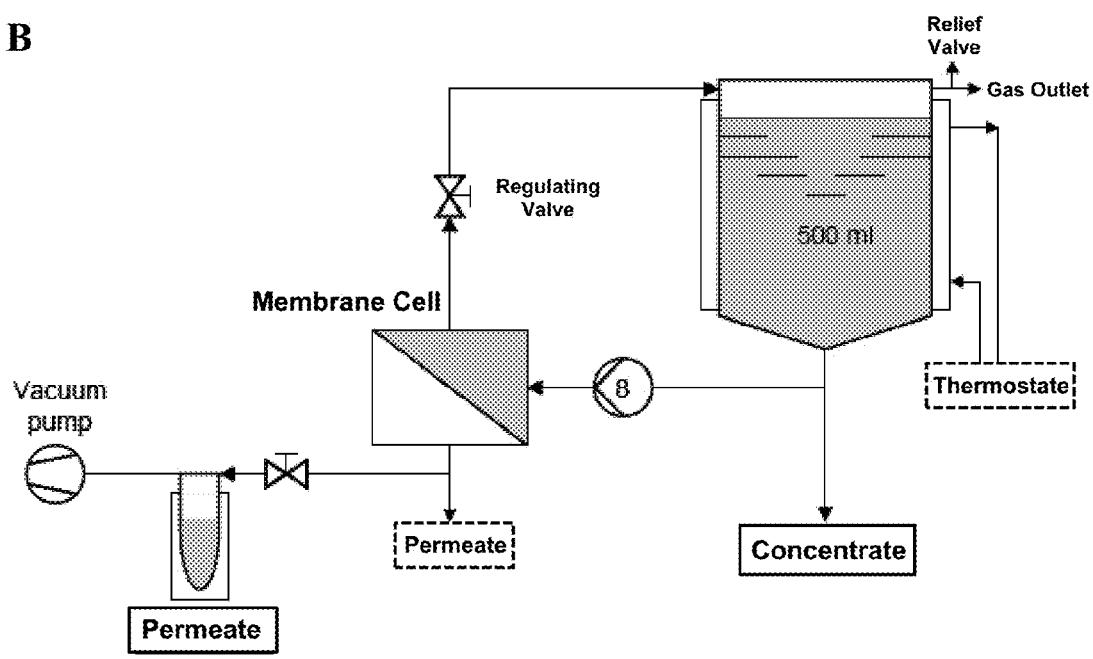

A pervaporation membrane unit has been developed that can process alcohol/water solutions to selectively separate alcohol from water (FIG. 8). In one example, an ethanol/water (90/10) wt % mixture was separated using a SULZER PERVAP2200® membrane. The process shows good reproducibility with sufficient scalability. Regression analysis shows that the data is within 95% confidence limits (FIG. 10B) with an error of ±4.68 mole/m$^2$ hr in the prediction of water flux. Water preferentially permeated through the hydrophilic SULZER polyvinyl alcohol membrane with a selectivity of 200-450 depending on the water concentration in the feed. The average flux of 0.62 kg/m$^2$ hr and ethanol loss of 3.5% obtained experimentally were within standard operating losses for pervaporation membranes. Flux versus fugacity data shows a linear trend and follows the theory of pervaporation (Eq. 2) allowing for extrapolation to design level of water concentration with confidence. This facilitates the calculation of a single value for permeability of water (~6.8×10−9 mole/m hr Pa) through the membrane.

The pervaporation experiments are carried out on a lab-scale unit manufactured by SULZER Chemtech. A schematic and photograph of the unit are shown in FIG. 8B. The stainless steel units used in the experiments are suitable to handle hydrocarbon mixtures. The feed is introduced via a centrifugal pump from a 2 liter capacity, heated storage tank across a vertically aligned flat sheet membrane (effective area of 165 cm$^2$). The permeate vapors drawn via a vacuum pump are collected in two glass condensers placed in series. The condensers are placed in dewars filled with liquid $N_2$ to ensure complete condensation of the permeate vapors. The membrane cell is arranged with a sintered disk, fleece sheet (to protect the membrane), membrane (with the selective layer facing the feed) and an O-ring (to have a good vacuum seal). The membrane cell is mounted vertically, in one configuration, but dependent upon the feed stream, surface area and membrane cell geometry, the system may be assembled in various orientations. Commercial membrane cells may be manufactured with a variety of configurations that depend upon both the membrane design and the process design.

In one embodiment an ethanol/water (90/10 wt %) feed at 80° C. is separated using a hydrophilic membrane (SULZER PERVAP 2200®). The membrane has a polyvinyl alcohol (PVA) selective layer (~4 micron thick) on a polyacrylonitrile (PAN) support (70-100 microns). In one embodiment, a hydrophilic membrane is fed a 90/10 wt % ethanol/water feed composition at 100° C., with a 140 liter/hr flow rate, permeate pressure is maintained at 3 mbar. Conditions are maintained at constant to gauge the experimental errors and repeatability of membrane performance. Other conditions like feed temperature, flow rate and permeate pressure may adjust to changes in membrane type, feedstock composition or flux rate.

Start up is initiated to prepare the system for pervaporation. The membrane unit with the condensers is arranged as shown in FIG. 8B. Feed is circulated until the desired temperature is reached. A sample of the feed is taken prior to pervaporation. A sample of the permeate condensate is also taken. These are permeate vapors which are condensed via liquid $N_2$ on the product side.

During pervaporation the system is allowed to run at the steady-state feed temperature. Feed samples are collected after a period of time on stream. For commercial membranes with a thin selective layer (~1-4 microns), the time required to achieve concentration stabilization may be less (on the order of a few minutes). For the next interval, more feed is collected. This will be the first feed sample after achieving steady-state at the required temperature. The concentration of feed used for the second interval will be based on the moving average of previous time intervals to account for any feed concentration variation in a batch process. The condensers are weighed after reaching room temperature to calculate the mass of permeate collected. The mass of permeate divided by the membrane area and time interval gives the total flux across the membrane. Feed and permeate samples are analyzed in a gas chromatograph (GC) to determine their respective concentrations. Selectivity across the membrane may be calculated using Eq. 7. Samples may be collected at 1-hour time intervals through a given period. The feed is typically changed for a repeat run the next time period (24 hr, 8 hr, or other time period). The runs are repeated until the curves of flux versus average concentration data coincide.

Figure 9:
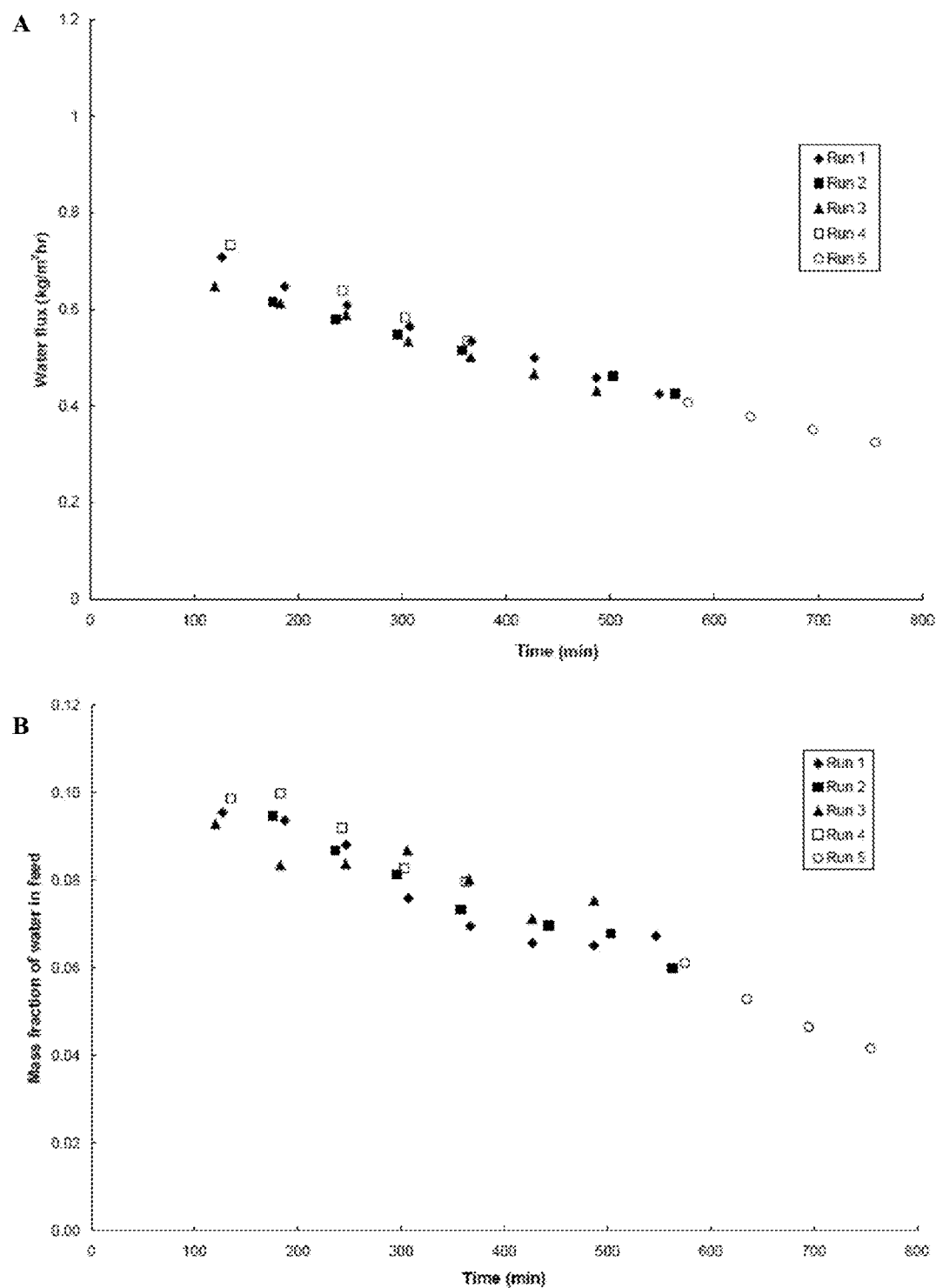
FIG. 9: A) Trend in water flux as a function of time. Feed: Ethanol/water (90/10 wt %) mixture at 80° C. B) Concentration of water in feed as a function of time.

FIG. 9A shows a gradual decrease in water flux over the duration of the batch experiment. This result follows directly from Eq. 2, as water continues to permeate through the membrane, the water concentration in the feed should decrease correspondingly. This decreases the fugacity or the driving force for pervaporation. Hence, there is a drop in the water flux over time. This observation is further confirmed by the GC analysis of the feed water at various intervals during the experiment. FIG. 9B, a plot of water concentration versus time, shows a 40% drop in water concentration from 10% to 6% in feed during an 8 hour run and subsequent drop to 4% during an extended run (Run 5). This shows that the hydrophilic PVA membrane is applicable for water permeation. In contrast, ethanol gets enriched in the feed that is re-circulated. Analysis of the permeate (FIG. 10A) shows a small loss of ethanol (<5%) into the permeate stream.

Figure 10:
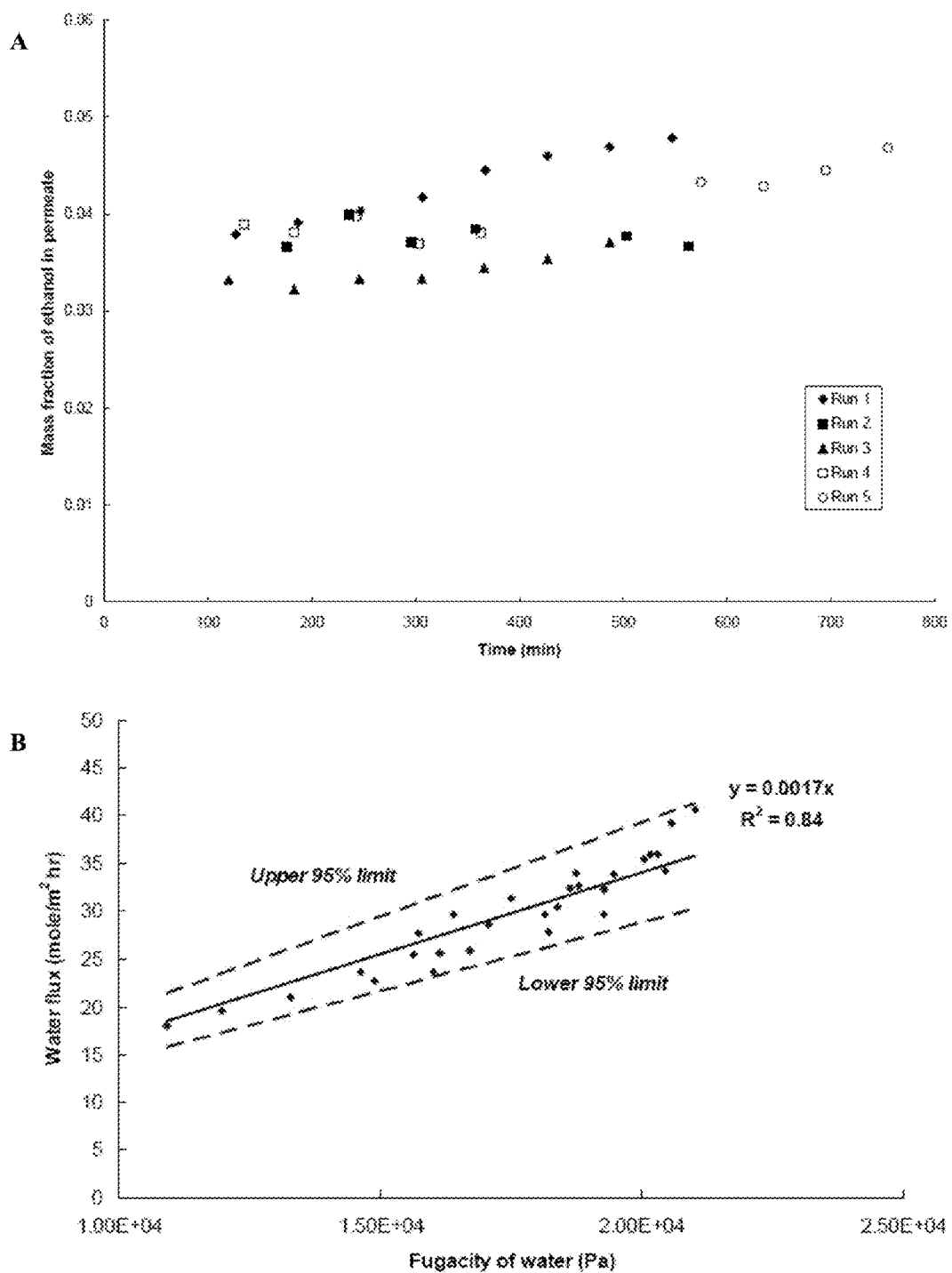
FIG. 10: A) Concentration of ethanol in permeate as a function of time. B) Water flux is plotted as a function of the driving force. The slope of the trend line gives the permeance across the membrane. The fugacity (Pa) of water in the feed is highest at the start of the experiment and decreases as the experiment proceeds (from the right to the left on X axis). Note: Runs 1-5 have been plotted with the same symbol to describe a linear overall trend.

In pervaporation, the flux of a component increases with its fugacity or driving force (Eq. 2). Water flux is a linear function of the fugacity of water in feed (FIG. 10). The slope of the line gives the permeance of water (~$1.7 \times 10^{-3}$ mole/m² hr Pa). Permeance multiplied by the membrane thickness (thickness of selective layer) gives the corresponding permeability value. For a membrane thickness of 4 microns, the permeability of water at the given conditions is ~$6.8 \times 10^{-9}$ mole/m² hr Pa. The data can be fitted to a straight line with an R-squared value of 0.84. This shows good repeatability of the data within the experimental error. The scatter in the flux versus fugacity data is typical for pervaporation experiments performed previously with water. Regression analysis shows that the experimental data is within the 95% confidence limits with a cumulative error of ±4.68 mole/m² hr in predicting the value of water flux.

TABLE 4

Comparison of COP and SULZER pervaporation membrane performance data. Values expressed are average values for ethanol/water (90/10) wt % mixture at 80° C.

|  | Pervaporation | Expected |
|---|---|---|
| Total Flux (kg/m² · hr) | 0.62 | 0.45 |
| Ethanol Loss (wt %) | 3.5% | <5% |

The flux and ethanol loss values observed in Table 4 are better than the expected values calculated from the flux model in Eq. 2. The data obtained shows a higher flux and a corresponding lower ethanol loss into the permeate. Given the variables associated with the experiment (e.g. uniform feed temperature, high vacuum on permeate side etc) and the propagation of errors, the results obtained are statistically equivalent with the expected values.

Figure 11:
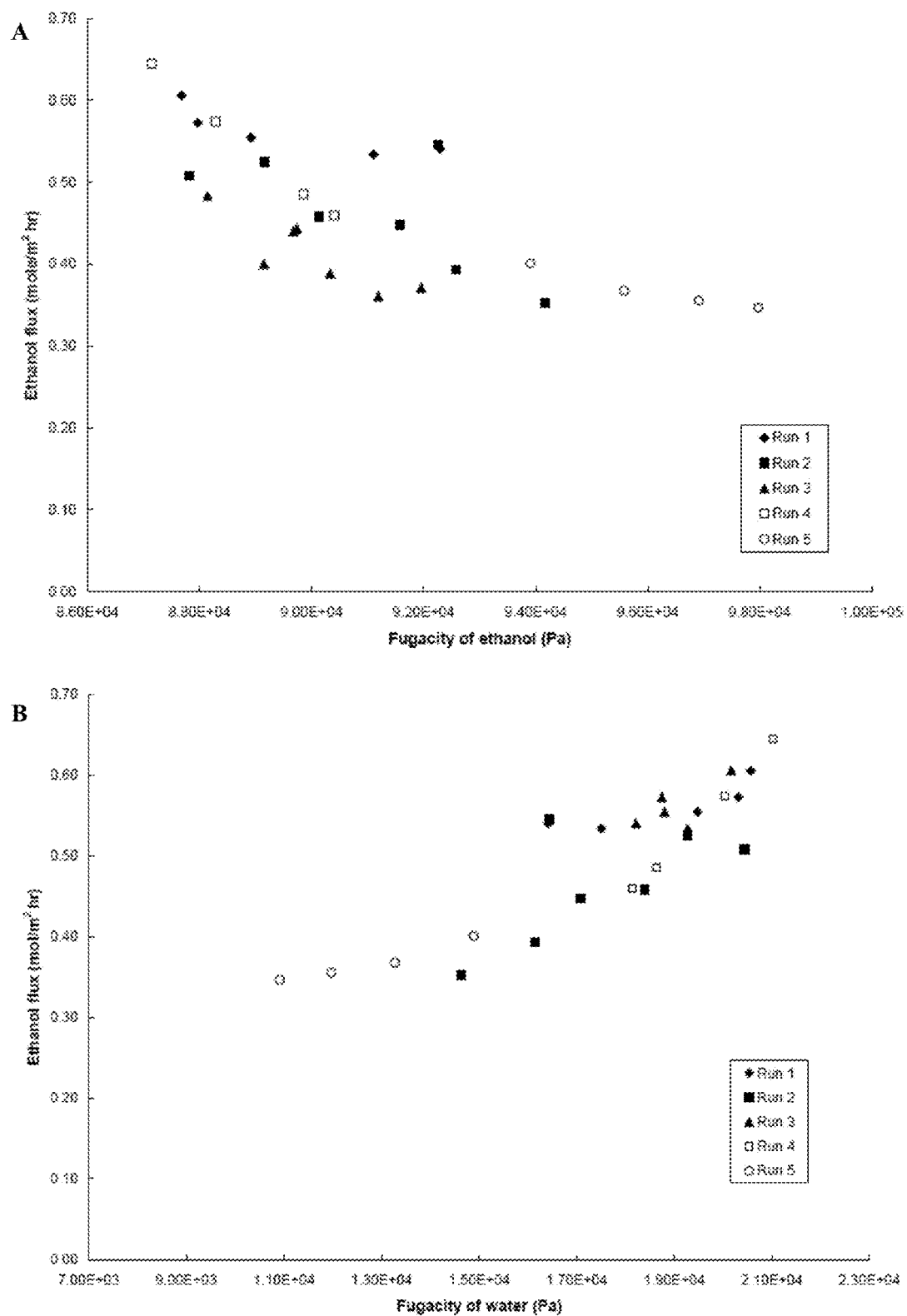
FIG. 11: A) Ethanol flux is plotted as a function of the fugacity of ethanol in feed. The fugacity of ethanol in the feed is lowest at the start of the experiment and increases as the experiment proceeds (from the left to the right on X axis). B) Effect of fugacity of water in feed on ethanol flux. The fugacity of water in the feed is highest at the start of the experiment and decreases as the experiment proceeds (from the right to the left on X axis).
Figure 12:
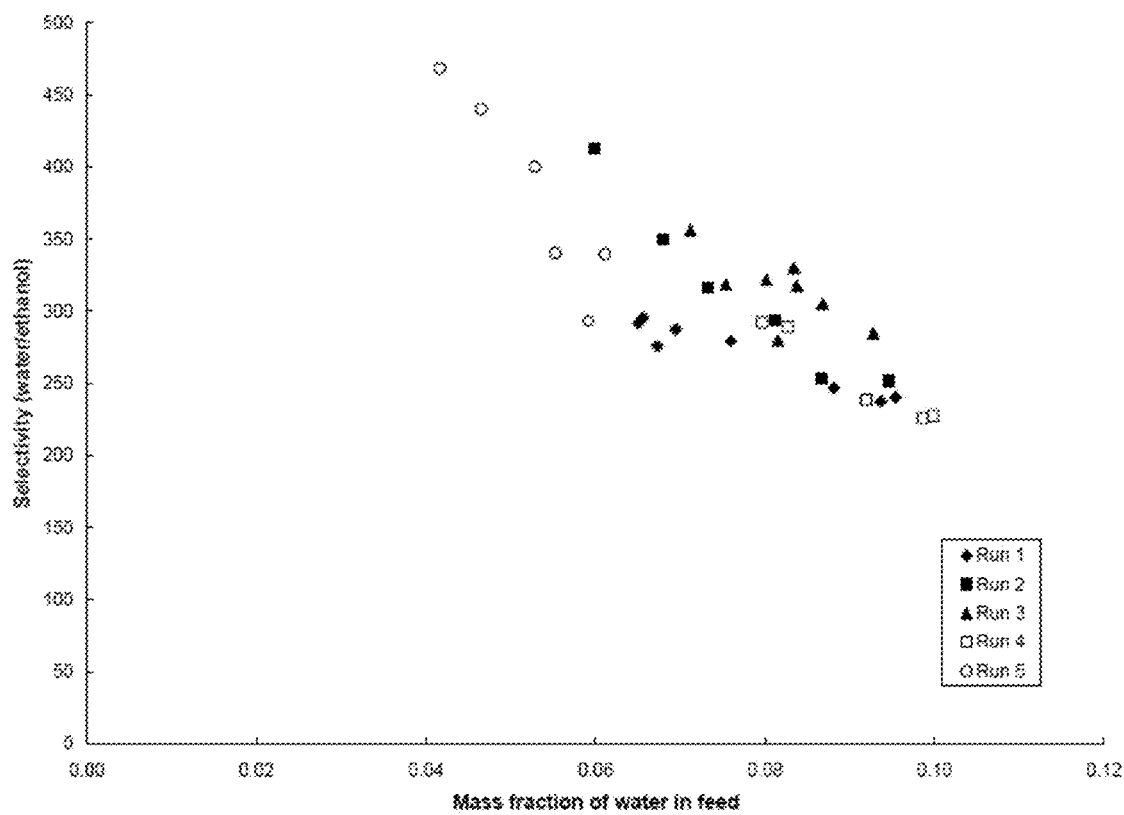
FIG. 12: Selectivity of water over ethanol as a function of water concentration in feed.

Polymeric membranes when exposed to certain solvents tend to swell over time. This behavior is termed as plasticization. In the above experiments, as the membrane became plasticized it loss the ability to discriminate between ethanol and water. This led to more ethanol flux through the hydrophilic membrane,and as a result, the selectivity of water over ethanol decreases over the course of the experiment. The ethanol flux should increase with increase in the fugacity or concentration. However, a reverse trend is observed (FIG. 11A) where the ethanol flux decreases with the increase in fugacity (or the feed concentration) of ethanol. Therefore, it is plausible to conclude that the ethanol flux is influenced by another factor; most probably by the plasticization of the membrane due to the water present in feed. This explanation is verified with the dependence of ethanol flux on the feed water concentration or fugacity (FIG. 11B). The increase in ethanol flux with water concentration is a direct effect of plasticization of the PVA membrane by water. The plasticization effect is confirmed further as the concentration of water in the feed increases (FIG. 12), the selectivity of water/ethanol drops with the corresponding increase in ethanol flux (FIG. 11B). For the different runs performed the selectivity of water/ethanol drops from 450 to 200 depending on the water concentration.

A pervaporation system has been demonstrated that can dehydrate alcohol compositions for use in hydrocarbon fuels. Use of a pervaporation system will reduce $CO_2$ emissions and decrease the carbon footprint for producing renewable fuels. This improves the advanced cellulosic fuel production process by decreasing $CO_2$ production for renewable fuels produced using this system. Decreasing $CO_2$ is essential to achieve the appropriate carbon reduction for an advanced cellulosic renewable fuel.

Example 3

Production of Advanced Cellulosic Renewable Fuels

A complete system and method of producing advanced cellulosic renewable fuels has been developed that uses an biomass source with high levels of oxygenate and converts the oxygenated biomass to ethanol and blended ethanol renewable gasoline fuels. Oxygenates, including soluble carbohydrates, organic acids, polyols, and alcohols are produced from biomass through a variety of reactions including acid hydrolysis, pyrolysis, fermentation and other conventional biomass conversions. The oxygen rich aqueous solutions are difficult to process because of the corrosive nature of oxygenate containing solutions and subsequent coking propensity of these mixtures inside reactors. The system developed (FIG. 1) produces gasoline range fuels and fuel grade alcohols ready to blend as advanced cellulosic renewable fuels that are fungible with current gasoline products. This method demonstrates the production of a neat fuel product blend that can be synthesized from 100% renewable material and integrated without any deleterious effects on the current hydrocarbon transportation pipeline infrastructure and vehicle powertrains.

In one embodiment (FIG. 1), incoming dilute aqueous oxygenate solutions are separated into an organic acid fraction and a polyol fraction using one or more ionic separations (ISEP) as required by the composition of the incoming oxygenate solution. The polyol fraction is transferred to a traditional hydrotreating (HT) reactor. The hydrotreating (HT) reactor produces various alkanes, water, light hydrocarbon byproducts and intermediates. The alkanes produced by from hydrotreating can be isomerized in to various fuel range products in an isomerization reactor. The organic acids and hydrogen are fed to a hydrodeoxygenation (HDO) reactor to produce various alcohols from the mixed organic acids. The aqueous alcohol solutions produced are separated using cold separation into an aqueous fraction and an alcohol fraction. The alcohol fraction containing between 50 and 99% wt % alcohol are dehydrated using pervaporation to produce fuel grade alcohol with less than 500 ppm water. The dehydrated alocohol is blended with the isomerized fuel products to produce commercial grade E85 fuel with up to 85% alcohol, E10 fuel with up to 10% alcohol, E20 with up to 20% alcohol and premium fuel with an octane rating between 97 and 103 octane.

Figure 2:
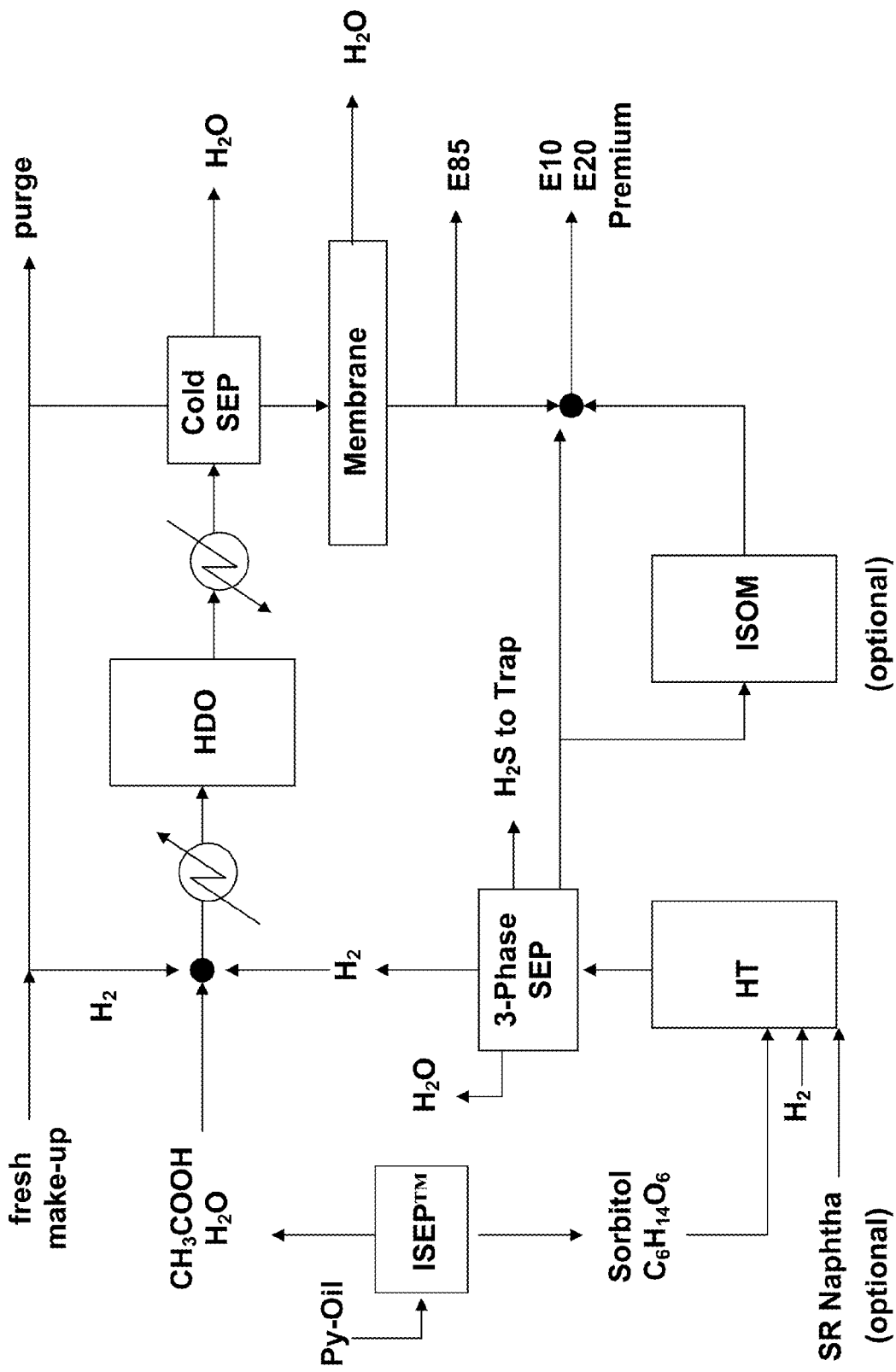
FIG. 2: Pyrolysis Oil Advanced Cellulosic Gasoline Process
Figure 3:
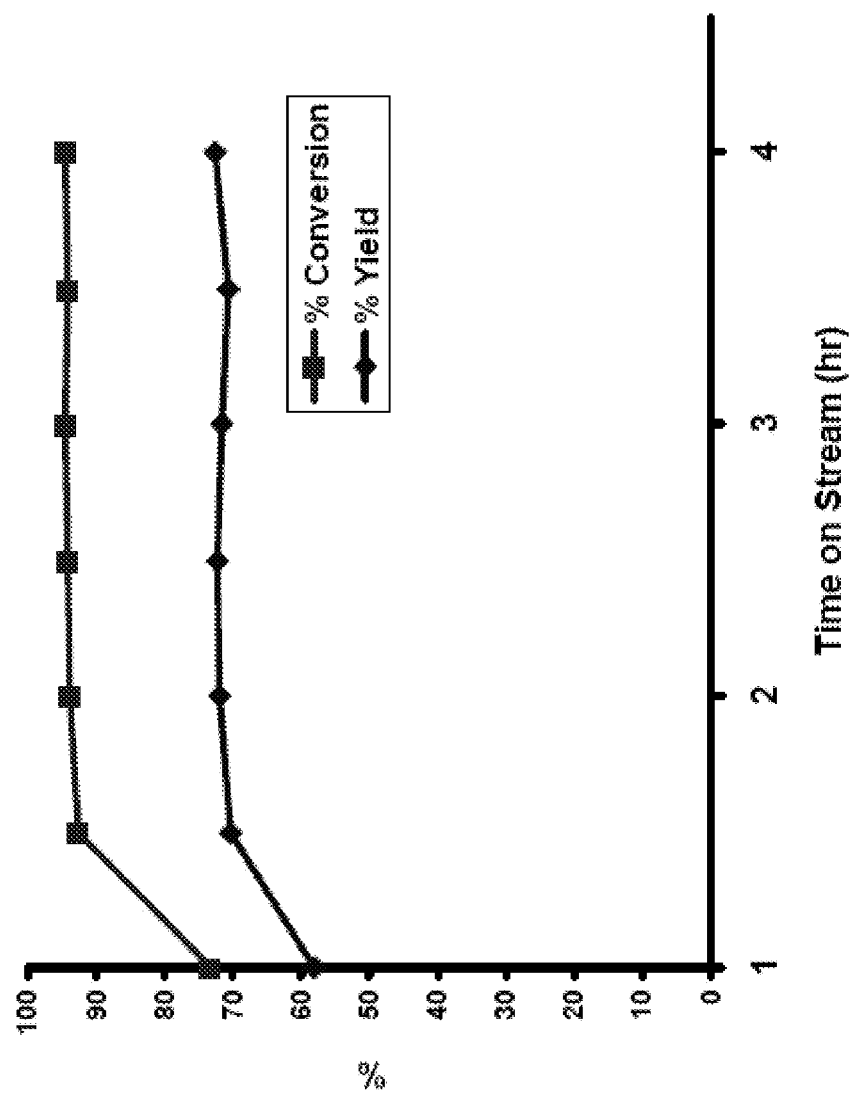
FIG. 3: Representative plot of % conversion of acetic acid and yield to ethanol vs. time on stream for a high conversion run. These data were collected at 325° C., 400 psig, LHSV=7.5 h$^{-1}$.

In another embodiment (FIG. 2), pyrolysis oil containing organic acids including acetic acid and polyols including sorbitol are upgraded to advanced cellulosic renewable fuels. An aqueous pyrolysis oil feedstock is separated into an acetic acid fraction and a sorbitol fraction through ionic separation. The sorbitol fraction is converted with naphtha and hydrogen to produce n-hexane through hydrodesulferization. Hexane is separated from water and $H_2S$ to produce dry hexane. The dry hexane is isomerized to produce any number of fuel range hydrocarbons including aromatics, paraffins, naphthas, and the like, dependent upon the temperatures and length of isomeriziation reaction. A portion of the hexane is mixed with the acetic acid solution and hydrogen for HDO. Ethanol and water from HDO are cold separated to remove water. Produced ethanol between 50 and 90% wt % ethanol is dehydrated by one or more pervaporation steps to produce ethanol with less than 500 ppm water. Ethanol may contain less than 200 ppm water after pervaporation. In one embodiment, ethanol contains less than 100 ppm water. Ethanol and fuel range hydrocarbons are blended to produce E85, E20, E10, and/or premium gasoline range fuel products.

Advanced cellulosic renewable fuels are produced from biomass oxygenate solutions. The system described produces both renewable alcohols and renewable fuel range hydrocarbons that can be blended with or without non-renewable hydrocarbons. This demonstrates a 100% renewable fuel product with very low $CO_2$ production. The renewable fuel product can be incorporated into existing fuel systems without modification.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. U.S. Pat. No. 1,302,011, Christiansen, (1919).
2. U.S. Pat. No. 1,605,093, Bouvier and Blanc,(1926).
3. U.S. Pat. No. 1,971,742, Berisch, H., (1934).
4. U.S. Pat. No. 2,079,414, Lazier, (1937).
5. U.S. Pat. No. 2,091,800, Adkins, et al., (1937).
6. U.S. Pat. No. 2,093,159, Schmidt,. (1937).
7. U.S. Pat. No. 2,322,095, Schmidt, (1943).
8. U.S. Pat. No. 2,322,096, Schmidt, (1943).
9. U.S. Pat. No. 2,322,097, Schmidt, (1943).
10. U.S. Pat. No. 2,549,416, Brooks, (1951).
11. U.S. Pat. No. 2,607,807, Ford, (1952).
12. U.S. Pat. No. 2,782,243, Hess and Schulz, (1957).
13. U.S. Pat. No. 3,197,418, Maebashi and Yamo, (1965).
14. U.S. Pat. No. 3,361,832, Pine and Ellert, (1968).
15. U.S. Pat. No. 3,363,009, Schuman, (1968).
16. U.S. Pat. No. 3,478,112, Adam, et al., (1969).
17. U.S. Pat. No. 4,113,662, Wall, (1978).
18. U.S. Pat. No. 4,149,021, Wall, (1979).
19. U.S. Pat. No. 4,220,803, Marcinkowsky and Henry, (1980).
20. U.S. Pat. No. 4,282,323, Yates, (1981).
21. U.S. Pat. No. 4,283,581, Wilkes, (1981).
22. U.S. Pat. No. 4,359,404, Grey and Pez, (1982).
23. U.S. Pat. No. 4,398,039, Pesa, et al., (1983).
24. U.S. Pat. No. 4,421,939, Kiff and Schreck, (1983).
25. U.S. Pat. No. 4,443,639, Pesa, et al., (1984).
26. U.S. Pat. No. 4,456,775, Travers, et al., (1984).
27. U.S. Pat. No. 4,517,391, Ludwig, et al., (1985).
28. U.S. Pat. No. 4,611,085, Kitson, (1986).
29. U.S. Pat. No. 4,628,130, Bournonville, et al., (1986).
30. U.S. Pat. No. 4,762,817, Logsdon, et al., (1988).
31. U.S. Pat. No. 4,777,303, Kitson and P.S. Williams,. 1988.
32. U.S. Pat. No. 4,804,791, Kitson and Williams, (1989).
33. U.S. Pat. No. 4,826,795, Kitson and Williams, (1989).
34. U.S. Pat. No. 4,918,248, Hattori, et al., (1990).
35. U.S. Pat. No. 4,929,777, Irick, et al., (1990).
36. U.S. Pat. No. 4,973,717, Williams, (1990).
37. U.S. Pat. No. 4,985,572, Kitson and Williams, (1991).
38. U.S. Pat. No. 5,008,235, Wegman and Bryant, (1991).
39. U.S. Pat. No. 5,142,067, Wegman and Bryant, (1992.
40. U.S. Pat. No. 5,149,680, Kitson and Williams, (1990).
41. U.S. Pat. No. 5,155,086, Thakur, et al., (1992).
42. U.S. Pat. No. 5,345,005, Thakur, et al., (1994).
43. U.S. Pat. No. 5,387,753, Scarlett, et al., (1995).
44. U.S. Pat. No. 5,403,962, Schneider, et al., (1995).
45. U.S. Pat. No. 5,478,952, Schwartz, (1995).
46. U.S. Pat. No. 5,475,159, Singleton and Murray, (1995).
47. U.S. Pat. No. 5,959,167, W09910450, Shabtai, et al., (1999).
48. U.S. Pat. No. 6,008,384, Bockrath, et al., (1999).
49. U.S. Pat. No. 6,054,627, Thakur, et al., (2000).
50. U.S. Pat. No. 6,140,545, Merger, et al., (2000).
51. U.S. Pat. No. 6,403,844, Zhang, et al., (2002).
52. U.S. Pat. No. 6,455,464, Chen, (2002).
53. U.S. Pat. No. 6,509,180, Verser and Eggeman, (2003).
54. U.S. Pat. No. 6,765,118, Fischer, et al., (2004).
55. U.S. Pat. No. 7,119,237, Prinz, et al., (2006).
56. U.S. Pat. No. 7,351,559, Verser and Eggeman, (2008).
57. U.S. Pat. No. 7,578,927, US2008053870, WO2008027699, Marker and Petri, "Gasoline and Diesel Production from Pyrolytic Lignin Produced from Pyrolysis of Cellulosic Waste" (2008).
58. US2008050792, WO2006119357, Zmierczak and Miller, "Processes for Catalytic Conversion of Lignin To Liquid Bio-Fuels And Novel Bio-Fuels" (2006)
59. US2008092435, WO2008051984, Bzdek and Pellegrino, "Methods of Purifying Biodiesel Fuels" (2008)
60. WO2008113492, Baldiraghi, et al., "Hydrocarbon Composition Useful as a Fuel and Fuel Oil Containing a Petroleum Component and a Component of a Biological Origin" (2008)
61. WO2010145901, Vandezande, et al., "Thin Film Pervaporation Membranes." (2010).
62. EP0175558, Moy, (1986).

63. EP0198681, Kitson and Williams, (1986).
64. EP0285420, Kitson and Sefton, (1988).
65. EP0953560, Tustin, e al., (1999).
66. Baker, "Pervaporation, in Membrane technology and applications." Wiley. p. 355-392 (2004).
67. Benaissa, H., et al., "Heteropoly Compounds as Catalysts for Hydrogenation of Propanoic Acid." J. Catalysis 253:244-252 (2008).
68. Holman and Gajda, "Analysis of experimental data, in Experimental methods for engineers." McGraw-Hill New York. p. 46-94 (1994).
69. Kleinert, et al., "Optimizing solvolysis conditions for integrated depolymerisation and hydrodeoxygenation of lignin to produce liquid biofuels." J. Analytical and Applied Pyrolysis 85:108-117 (2009).
70. Mulder and Smolders, "On the mechanism of separation of ethanol/water mixtures by pervaporation. I: Calculations of concentration profiles." J. Membrane Sci., 17:289-307 (1984).
71. Nagayama, et al., "Direct Hydrogenation of Carboxylic Acids Corresponding Aldehydes Catalyzed by Palladium Complexes." Bull. Chem. Soc. Jpn., 74:1803-15 (2001).
72. Natal Santiago, et al., "Catalytic Reduction of Acetic Acid, Methyl Acetate, Ethyl Acetate over Silica-Supported Copper." Journal of Catalysis, 193:16-28 (2000).
73. Pan and Habgood, "Gas separation by permeation Part II: Effect of permeate pressure drop and choice of permeate pressure." Canadian J. Chem. Eng., 56:210-217 (2009).
74. Peng, et al., "Recent advances in VOCs removal from water by pervaporation." J. Hazardous Materials, 98:69-90 (2003).
75. Pestman, et al., "Selective Hydrogenation of Acetic Acid Towards Acetaldehyde." J. Royal Netherlands Chem. Soc., 113:426-30 (1994).
76. Pestman, et al., Reactions of Carboxylic Acids on Oxides: 1. Selective Hydrogenation of Acetic Acid to Acetaldehyde. J. Catalysis, 168:255 - 264 (1997).
77. Pestman, et al., "Identification of the Active Sites in the Selective Hydrogenation of Acetic Acid to Acetaldehyde on Iron Oxide Catalysts." J. Catalysis,. 174:142-52 (1998).
78. Rachmady and Vannice, "Acetic Acid Hydrogenation over Supported Platinum Catalysts." J. Catalysis, 192: 322-34 (2000).
79. Rachmady and Vannice, "Acetic Acid Reduction to Acetaldehyde over Iron Catalysts." J. Catalysis, 208:158-69 (2002).
80. Rachmady and Vannice, "Acetic Acid Reduction by $H_2$ on Bimetallic PtFe Catalysts." J. Catalysis, 209:87-98 (2002).
81. Ribeiro and Borges, "Using pervaporation data in the calculation of vapour permeation hollow-fibre modules for aroma recovery." Brazilian J. Chem. Eng., 21:629-640 (2004).
82. Ribeiro, et al., "A combined gas-stripping vapour permeation process for aroma recovery." J. Membrane Science 238:9-19 (2004).
83. Shih and Keng, "Kinetics of the Ruthenium-Catalyzed Hydrogenation of Acetic Acid to Ethanol." J. Chin. Chem. Soc., 32:29-34 (1985).
84. Smith, et al., "Introduction to chemical engineering thermodynamics." McGraw-Hill Science/Engineering/Math (2005).
85. Tahara, et al., "Liquid-Phase Hydrogenation of Carboxylic Acid on Supported Bimetallic Ru-Sn-Alumina Catalysts." Appl. Catal. A:General, 154:75-86 (1997).
86. Toba, et al., "Synthesis of Alcohols and Dials by Hydrogenation of Carboxylic Acids and Esters over Ru-Sn-$Al_2O_3$ Catalysts." Appl. Catal. A:General, 189: 243-50 (1999).
87. Vane, "A review of pervaporation for product recovery from biomass fermentation processes." J. Chem. Tech. Biotech. 80:603-629 (2005).
88. Yokoyama and Yamagata, "Hydrogenation of Carboxylic Acids to the Corresponding Aldehydes." Appl. Catal. A:General, 221:227-39 (2001).
89. Yokoyama and Fujita, "Hydrogenation of Aliphatic Carboxylic Acids to Corresponding Aldehydes over Cr2O3-based Catalysts." Appl. Catal. A:General, 276:179-85 (2004).

The invention claimed is:

1. A method for producing a renewable gasoline from cellulosic biomass comprising:
   a) separating a cellulosic feedstream in an ionic separator to generate a polyol stream comprising at least one of sugars and polyols and an organic stream comprising one or more organic acids and water;
   b) generating hydrocarbons comprising alkanes from the polyol stream in a hydrotreating reactor and converting at least a portion of the hydrocarbons to isomerized gasoline range hydrocarbons in an isomerization reactor
   c) generating alcohol from the organic stream, at least a portion of the hydrocarbons from the hydrotreating reactor and hydrogen in a hydrodeoxygenation reactor
   d) separating the alcohol, water, and hydrogen in a cold separator, and removing water using a membrane separator; and
   e) producing one or more product renewable gasoline streams comprising the alcohols, at least a portion of the hydrocarbons from the hydrotreating reactor and the isomerized gasoline range hydrocarbons.

2. The method of claim 1, wherein said hydrodeoxygenation reactor comprises a catalyst selected from the group consisting of CuO, ZnO, Fe2O3, CuO/ZnO, CuO/Fe2O3, ZnO/Fe2O3, CuO/ZnO/Fe2O3, CuO/ZnO/Al2O3, CuO/Al2O3/SiO2, CuO/Fe2O3/Al2O3/SiO2, and combinations thereof.

3. The method of claim 1, wherein said membrane separator comprises a membrane selected from the group consisting of hydrophilic, hydrophobic, organphillic, polydimethylsiloxane (PDMS), polyvinyl alcohol (PVA), polyimide, ceramic, zeolite, amorphous silica, hybrid membranes, and combinations thereof.

* * * * *